US010777095B1

(12) United States Patent
Bang

(10) Patent No.: US 10,777,095 B1
(45) Date of Patent: Sep. 15, 2020

(54) METHOD TO DEVELOP PRONUNCIATION AND INTONATION PROFICIENCY OF ENGLISH AND APPARATUS USING THE SAME

(71) Applicant: Il Sung Bang, Gyeongsangnam-do (KR)

(72) Inventor: Il Sung Bang, Gyeongsangnam-do (KR)

(*) Notice: Subject to any disclaimer, the term of this patent is extended or adjusted under 35 U.S.C. 154(b) by 0 days.

(21) Appl. No.: 16/898,092

(22) Filed: Jun. 10, 2020

(30) Foreign Application Priority Data

Sep. 10, 2019 (KR) .......................... 10-2019-0112305

(51) Int. Cl.
*G09B 19/04* (2006.01)
*G10L 21/055* (2013.01)
(Continued)

(52) U.S. Cl.
CPC ........... *G09B 19/04* (2013.01); *G06F 3/0484* (2013.01); *G09B 5/00* (2013.01); *G09B 5/04* (2013.01); *G09B 5/062* (2013.01); *G09B 5/065* (2013.01); *G09B 7/00* (2013.01); *G10L 13/08* (2013.01); *G10L 15/183* (2013.01); *G10L 21/055* (2013.01)

(58) Field of Classification Search
CPC ......... G10L 21/00; G10L 21/06; G10L 21/10; G10L 2015/025; G10L 2015/022; G10L 15/02; G10L 15/18; G10L 15/1815; G10L 15/1822; G10L 15/183; G10L 15/187; G10L 15/19; G10L 15/193; G10L 15/197; G10L 15/20; G10L 21/02; G10L 13/00; G10L 13/02; G10L 13/08
See application file for complete search history.

(56) References Cited

U.S. PATENT DOCUMENTS

2006/0149558 A1* 7/2006 Kahn .................. G10L 15/18
704/278
2010/0153115 A1* 6/2010 Klee .................. G10L 13/08
704/260
(Continued)

FOREIGN PATENT DOCUMENTS

JP 2004226556 8/2004
KR 101333946 11/2013
(Continued)

*Primary Examiner* — Linda Wong
(74) *Attorney, Agent, or Firm* — IPLA P.A.; James E. Bame

(57) ABSTRACT

A method to develop pronunciation and intonation proficiency of English using an electronic interface, includes: preparing video bites each having an English language sound clip; preparing a script of the sound clip, wherein the script is partially marked in accordance with a predetermined rule of a pronunciation and intonation rhythm; displaying a circle on a screen of the electronic interface, wherein the circle has an illuminant movably provided along the circle, wherein the circle is serially partitioned to first to fourth quadrants; selectively playing on the screen the sound clip and the script adjacent to the circle; and synchronizing the sound clip to the illuminant in accordance with the predetermined rule, wherein an angular velocity of the illuminant moving along the circle accelerates and decelerates in the first quadrant and substantially remains constant in the second and third quadrants.

20 Claims, 3 Drawing Sheets

(51) Int. Cl.
*G09B 5/04* (2006.01)
*G09B 7/00* (2006.01)
*G10L 15/183* (2013.01)
*G10L 13/08* (2013.01)
*G09B 5/00* (2006.01)
*G06F 3/0484* (2013.01)
*G09B 5/06* (2006.01)

(56) References Cited

U.S. PATENT DOCUMENTS

| | | | | |
|---|---|---|---|---|
| 2011/0035662 A1* | 2/2011 | King | ............... | G06F 40/169 715/273 |
| 2013/0018925 A1* | 1/2013 | Pegg | ............... | G11B 27/28 707/804 |
| 2013/0065205 A1* | 3/2013 | Park | ............... | G06T 13/40 434/157 |
| 2015/0046160 A1* | 2/2015 | Kim | ............... | H04N 21/4884 704/235 |
| 2015/0073789 A1* | 3/2015 | Hashimoto | ........ | G10L 15/005 704/235 |
| 2015/0229978 A1* | 8/2015 | Brown | ............... | G06T 13/80 725/34 |
| 2015/0293600 A1* | 10/2015 | Sears | ............... | H04N 13/271 345/156 |
| 2018/0268732 A1* | 9/2018 | Thiel | ............... | G09B 5/02 |
| 2018/0277132 A1* | 9/2018 | Levoit | ............... | G10L 15/04 |
| 2018/0286459 A1* | 10/2018 | Li | ............... | G06F 16/64 |
| 2018/0301143 A1* | 10/2018 | Shastry | ............... | G10L 17/04 |
| 2019/0107942 A1* | 4/2019 | Rav-Noy | ............... | G06F 3/167 |
| 2019/0147876 A1* | 5/2019 | Printz | ............... | G10L 15/02 704/232 |
| 2019/0180734 A1* | 6/2019 | Liu | ............... | G10L 25/93 |
| 2019/0196675 A1* | 6/2019 | German | ............... | G09B 5/06 |
| 2020/0117713 A1* | 4/2020 | Ray | ............... | G06F 16/48 |
| 2020/0193975 A1* | 6/2020 | Blau-McCandliss | ............... | G10L 15/187 |

FOREIGN PATENT DOCUMENTS

KR 20140111175 9/2014
KR 101835127 3/2018

* cited by examiner

US 10,777,095 B1

METHOD TO DEVELOP PRONUNCIATION AND INTONATION PROFICIENCY OF ENGLISH AND APPARATUS USING THE SAME

BACKGROUND

This invention relates to developing English proficiency and more particularly to a method to develop pronunciation and intonation proficiency of English and an apparatus using the same method to optimally practice pronunciation and intonation of English utilizing English language video bites and sound clips.

English is known as an essential language at the era of globalization with about four hundred millions of people worldwide using it as a mother tongue or a second language in approximately sixty countries. And an increasing number of people using non-English languages are putting lots of hours and efforts to learn and master the English language but still having difficulty reaching a level of fluency in speaking English language. This would be most likely due to different breathing, pronunciations and intonation of English than their mother tongues.

A conventional problem commonly witnessed in learning English usually comes from difference in individual levels of fluency and proficiency depending on students and English teachers widely available in schools, language institutes and online lectures. Further, it is regarded as important for an English learner to practice a breathing tempo germane to English language.

SUMMARY OF THE INVENTION

The present invention is contrived to overcome the conventional disadvantages. Accordingly, an objective of the present invention is to provide a method to develop a pronunciation and intonation proficiency of English enabling an English learner to optimally practice English listening and speaking while shadowing an English video clip on a hand-held device like a tablet PC or a cellular phone.

Another objective is to provide a method to develop a pronunciation and intonation proficiency of English by using an illuminant applied circle realized on a screen to synchronize with an English sound clip played on the screen, thus maximizing efficiency of practicing English speaking capability.

Still another objective is to provide a method to develop a pronunciation and intonation proficiency of English allowing a user to visually practice an English speaking rhythm and tempo regardless of time, place and ambient atmosphere.

In order to achieve these and other objectives, the present invention provides a method to develop pronunciation and intonation proficiency of English using an electronic interface, comprising: preparing video bites each having an English language sound clip; preparing a script of the sound clip, wherein the script is partially marked in accordance with a predetermined rule of a pronunciation and intonation rhythm; displaying a circle on a screen of the electronic interface, wherein the circle has an illuminant movably provided along the circle, wherein the circle is serially partitioned to first to fourth quadrants; selectively playing on the screen the sound clip and the script adjacent to the circle; and synchronizing the sound clip to the illuminant in accordance with the predetermined rule, wherein an angular velocity of the illuminant moving along the circle accelerates and decelerates in the first quadrant and substantially remains constant in the second and third quadrants.

In a preferred embodiment, the angular velocity minimally decelerates in the fourth quadrant and the method may further comprise the step of controlling the screen to selectively pop up onto the screen the video bites and the script. The partial marking of the script may be realized in a moving marquee format. The electronic interface may be a hand-held device.

The illuminant may be an illuminating dot tethered to a bucket image. Further, the illuminant may be formed variable in color and image depending on a language format of the sound clip and the language format is one selected from a sentence, a phrase, a word, and a syllable.

For a better performance, the present invention further provides an electronic interface to develop pronunciation and intonation proficiency of English, comprising: a display unit to display on a screen of the electronic interface a circle, a video bite having an English language sound clip, and a script of the sound clip, wherein the circle has an illuminant movably provided along the circle, wherein the circle is serially partitioned to first to fourth quadrants, wherein the script is partially marked in accordance with a predetermined rule of a pronunciation and intonation rhythm; and a synch unit to synchronize the sound clip to the illuminant in accordance with the predetermined rule, wherein an angular velocity of the illuminant moving along the circle accelerates and decelerates in the first quadrant and substantially remains constant in the second and third quadrants, wherein the angular velocity minimally decelerates in the fourth quadrant. Preferably, the electronic interface may further comprise a screen control to selectively pop up onto the screen the video bites and the script.

BRIEF DESCRIPTION OF THE DRAWINGS

These and other features, aspects and advantages of the present invention will become better understood with reference to the accompanying drawings, wherein.

DETAILED DESCRIPTION OF THE INVENTION

Figure 1:
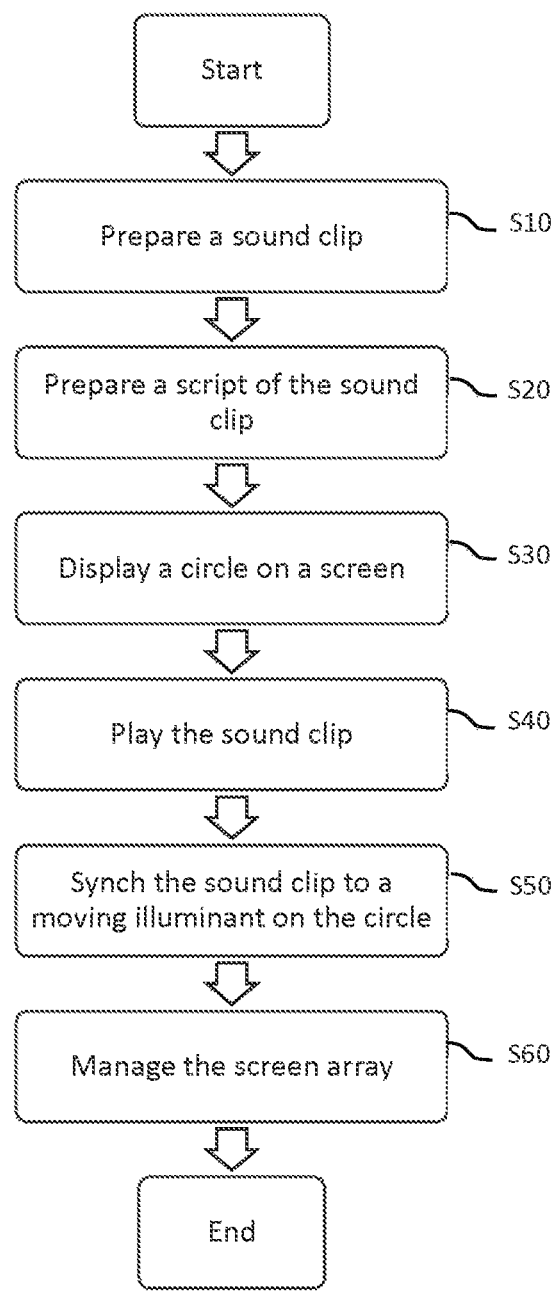
FIG. 1 is a flowchart showing the method to develop English proficiency in pronunciation and intonation according to the present invention.
Figure 2:
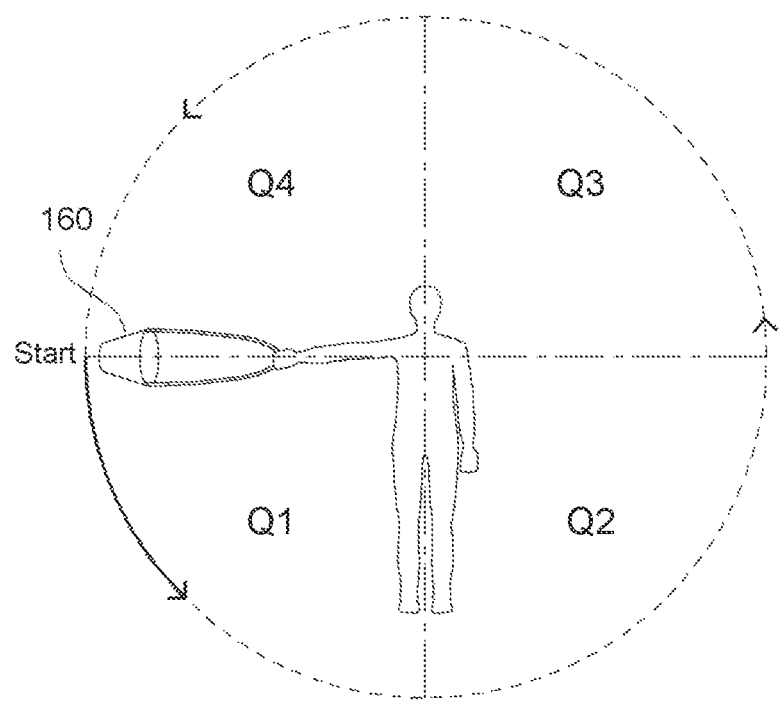
FIG. 2 is a diagram showing quadrants of a circle realized on the screen according to the present invention
Figure 3:
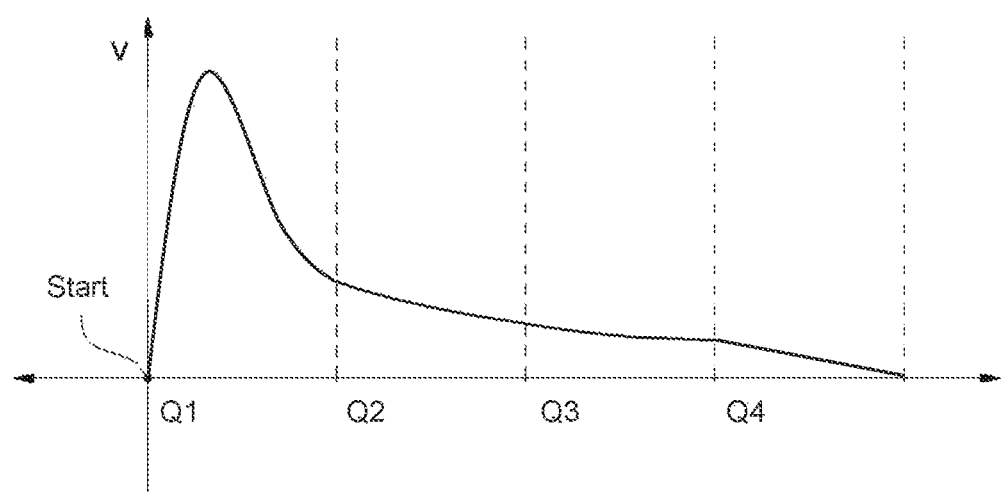
FIG. 3 is a diagram showing the quadrants in a graph format according to the present invention.
Figure 4:
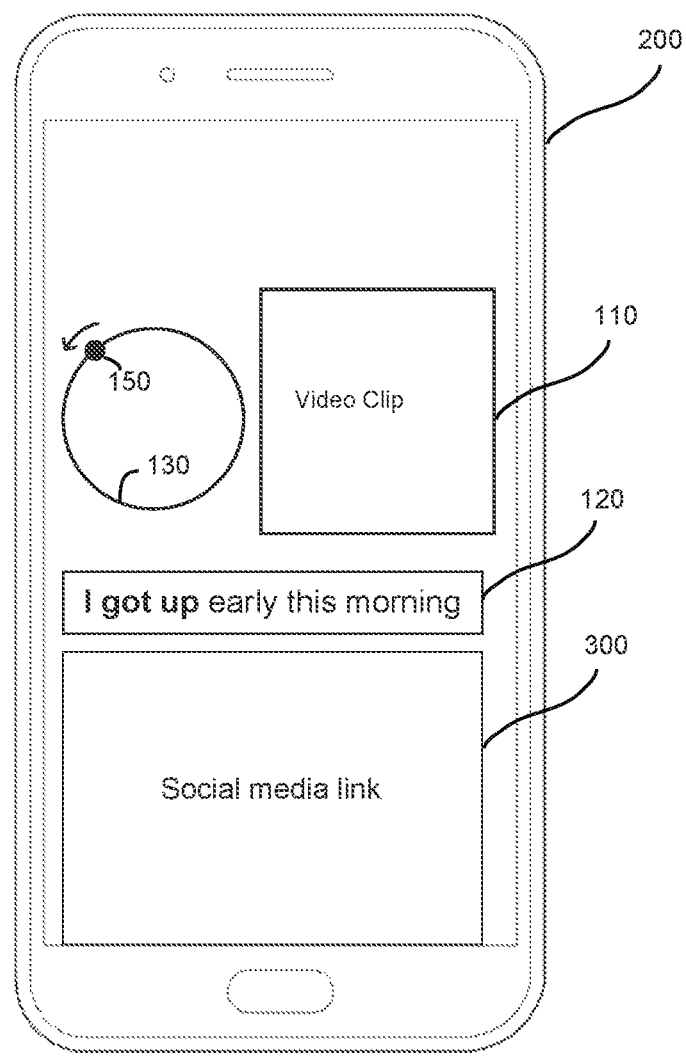
FIG. 4 is a diagram showing a screen arrangement of a hand held device according to the present invention.
Figure 5:
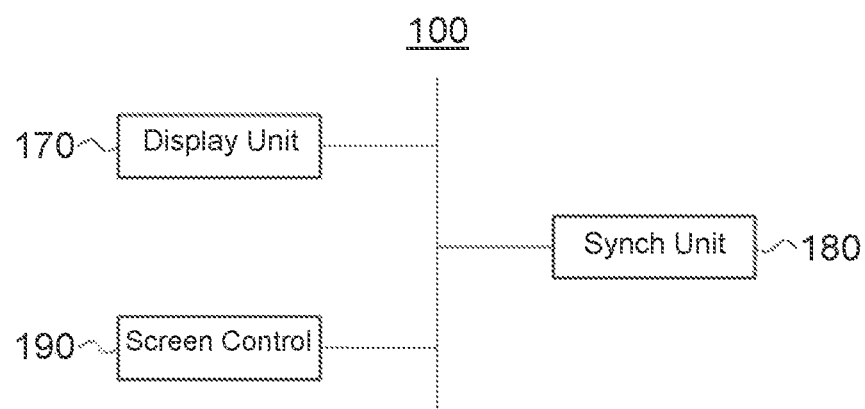
FIG. 5 is a diagram showing the structure of the electronic interface according to the present invention.

With reference to the accompanying drawings, a method to develop pronunciation and intonation proficiency of English using an electronic interface 100, comprises steps to maximize the efficiency of practicing a listening and speaking of English.

A first step S10 is to prepare video bites 110 each having an English language sound clip. The video bites may be selected from an English movie, an English drama, an English lecture, an English video download or other video materials having English language speech contents. Preferably, the course file of the video bite may be selected from AVI (audio video interleave), MOV (windows media video), MP4 or other digital video and audio file formats. Further, the video bites may be pre-classified from an entry to an advanced level and edited from seconds to minutes in length depending on the level of a target subject using the electronic interface.

A second step S20 is to prepare a script 120 of the sound clip, where it is preferred to have the script partially marked in accordance with a predetermined rule of a pronunciation and intonation rhythm. The predetermined rule can differ depending on a video material and the target subject. An example of the predetermined rule is to have a key word or key words of the script marked in bold or in highlight so the user can more clearly pronounce the words during a practice reading.

A third step S30 is to display a circle 130 on a screen 140 of the electronic interface 100, where the circle has an illuminant 150 movably provided along the circle. In this construction, the circle 130 can be serially partitioned to first to fourth quadrants Q1-Q4. The circle 130 and the video clips 110 may be selectively arranged side by side on the screen 140.

A fourth step S40 is to selectively play on the screen 140 the sound clip and the script 120 adjacent to the circle. Here, the sound clip is embedded in the video bites. In a preferred version, a button touch or a voice command can activate and deactivate the sound clip. The pop up of the sound clip links to the pop up of the script on the screen.

A fifth step S50 is to synchronize the sound clip to the illuminant 150 in accordance with the predetermined rule, where an angular velocity of the illuminant moving along the circle 130 accelerates and decelerates in the first quadrant Q1 and substantially remains constant in the second and third quadrants Q2 and Q3. The sound clip is synchronized to the illuminant 150 in such a way that the user can naturally imitate the specific English sound from the sound clip, while being guided by the illuminant moving on the circle. This way, the breathing, rhythm and tempo germane to the English speaker in the sound clip can naturally smear into the user using the electronic interface as a tool improving proficiency in English pronunciation and intonation.

In order to generate a maximum efficiency in practicing English pronunciation and intonation, the angular velocity of the illuminant may be configured to be controlled by the user of the electronic interface either to a slower pace or a faster pace depending on the user's level of English proficiency. That is, the user can adjust and control the angular velocity of the illuminant anytime during the practice so as to satisfy the user's needs. Further the illuminant can be adjustably set to run clockwise or counterclockwise.

The first to fourth quadrants in the circle 130 serve to guide the user to voice copy or shadow with ease the sound clip with or without the help of the script, thus effectively improving the level of English speaking capability of the user. In other words, the user can visually grasp the rhythm and tempo of a specific sound clip coming from the video bites with the helpful guide of the circle having the moving illuminant in addition to the script on the screen.

The acceleration and deceleration of the illuminant in the first and second quadrants signifies a clear start of the user's speaking, voice copying or shadowing in form of imitation of the sound clip being played. This mechanism enables the user to closely, accurately imitate the sound clip without a time gap between the start of the user's speaking and the voice start of the sound clip. After the signal to clearly start in the first quadrant Q1, the user is guided to keep a similar pace in the second and third quadrants Q2 and Q3. Preferably, the angular velocity of the illuminant 150 is set to minimally decelerate in the fourth quadrant Q4 so as to get the user ready for the fresh start in the first quadrant Q1. In order for the quadrant circle mechanism to seamlessly work, the length of the scrip is pre-adjusted and the marking of the script is pre-designed in accordance with the rhythm and tempo of the selected sound script.

A sixth step S60 is to control the screen to selectively pop up onto the screen the video bites and the script. The screen control can be operated by a screen touch or by a voice command. The arrangement of the video bites 110, the script 120 and the circle 130 on the screen 140 can be adjustable with a screen touch or a voice command by the user. In a preferred version, the screen 140 may include a social media link 300 so the user can real time communicate online, while practicing English, with an English instructor to ask questions or a peer group practicing English to share study experiences.

In an embodiment, the partial marking of the script 120 can be realized in a moving marquee format. For example, in concert with the start of the sound clip, bright highlights can emerge covering a selected part of the script in a moving marquee format. The electronic interface may be a handheld device 200 such as a tablet PC or a cellular phone. The illuminant may be an illuminating dot tethered to a bucket image 160. The illuminant is preferably formed variable in color and image depending on a language format of the sound clip. Here, the language format of the script can be one selected from a sentence, a phrase, a word, and a syllable.

The electronic interface 100 to develop pronunciation and intonation proficiency of English includes a display unit 170, a sync unit 180 and a screen control 190. The display unit 170 is configured to display on the screen 140 of the electronic interface a circle, a video bite having an English language sound clip, and a script of the sound clip. The circle 130 has an illuminant movably provided along the circle, where the circle is serially partitioned to first to fourth quadrants, where the script is partially marked in accordance with a predetermined rule of a pronunciation and intonation rhythm.

The synch unit 180 is configured to synchronize the sound clip to the illuminant in accordance with the predetermined rule, where an angular velocity of the illuminant moving along the circle accelerates and decelerates in the first quadrant and substantially remains constant in the second and third quadrants. Preferably, the angular velocity minimally decelerates in the fourth quadrant. The screen control 190 is configured to selectively pop up onto the screen the video bites and the script.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A method to develop pronunciation and intonation proficiency of English using an electronic interface, comprising:

preparing video bites each having an English language sound clip;

preparing a script of the sound clip, wherein the script is partially marked in accordance with a predetermined rule of a pronunciation and intonation rhythm;

displaying a circle on a screen of the electronic interface, wherein the circle has an illuminant movably provided along the circle, wherein the circle is serially partitioned to first to fourth quadrants;

selectively playing on the screen the sound clip and the script adjacent to the circle; and synchronizing the sound clip to the illuminant in accordance with the predetermined rule, wherein an angular velocity of the illuminant moving along the circle accelerates and decelerates in the first quadrant and substantially remains constant in the second and third quadrants.

2. The method of claim 1, further comprising: controlling the screen to selectively pop up onto the screen the video bites and the script.

3. The method of claim 1, wherein the partial marking of the script is realized in a moving marquee format.

4. The method of claim 1, wherein the electronic interface is a hand-held device.

5. The method of claim 1, wherein the illuminant is an illuminating dot tethered to a bucket image.

6. The method of claim 1, wherein the illuminant is formed variable in color and image depending on a language format of the sound clip, wherein the language format is one selected from a sentence, a phrase, a word, and a syllable.

7. The method of claim 1, wherein the angular velocity of the illuminant is controllable by a user of the electronic interface.

8. A method to develop pronunciation and intonation proficiency of English using an electronic interface, comprising:

preparing video bites each having an English language sound clip;

preparing a script of the sound clip, wherein the script is partially marked in accordance with a predetermined rule of a pronunciation and intonation rhythm;

displaying a circle on a screen of the electronic interface, wherein the circle has an illuminant movably provided along the circle, wherein the circle is serially partitioned to first to fourth quadrants;

selectively playing on the screen the sound clip and the script adjacent to the circle; and synchronizing the sound clip to the illuminant in accordance with the predetermined rule, wherein an angular velocity of the illuminant moving along the circle accelerates and decelerates in the first quadrant and substantially remains constant in the second and third quadrants, wherein the angular velocity minimally decelerates in the fourth quadrant.

9. The method of claim 8, further comprising: controlling the screen to selectively pop up onto the screen the video bites and the script.

10. The method of claim 8, wherein the partial marking of the script is realized in a moving marquee format.

11. The method of claim 8, wherein the electronic interface is a hand-held device.

12. The method of claim 8, wherein the illuminant is an illuminating dot tethered to a bucket image.

13. The method of claim 8, wherein the illuminant is formed variable in color and image depending on a language format of the sound clip, wherein the language format is one selected from a sentence, a phrase, a word, and a syllable.

14. The method of claim 8, wherein the angular velocity of the illuminant is controllable by a user of the electronic interface.

15. An electronic interface to develop pronunciation and intonation proficiency of English, comprising:

a display unit to display on a screen of the electronic interface a circle, a video bite having an English language sound clip, and a script of the sound clip, wherein the circle has an illuminant movably provided along the circle, wherein the circle is serially partitioned to first to fourth quadrants, wherein the script is partially marked in accordance with a predetermined rule of a pronunciation and intonation rhythm; and a synch unit to synchronize the sound clip to the illuminant in accordance with the predetermined rule, wherein an angular velocity of the illuminant moving along the circle accelerates and decelerates in the first quadrant and substantially remains constant in the second and third quadrants, wherein the angular velocity minimally decelerates in the fourth quadrant.

16. The electronic interface of claim 15, further comprising: a screen control to selectively pop up onto the screen the video bites and the script.

17. The electronic interface of claim 15, wherein the electronic interface is a hand-held device.

18. The electronic interface of claim 15, wherein the illuminant is an illuminating dot tethered to a bucket image.

19. The electronic interface of claim 15, wherein the illuminant is formed variable in color and image depending on a language format of the sound clip, wherein the language format is one selected from a sentence, a phrase, a word, and a syllable.

20. The method of claim 15, wherein the angular velocity of the illuminant is controllable by a user of the electronic interface.

* * * * *